Patented Aug. 9, 1932

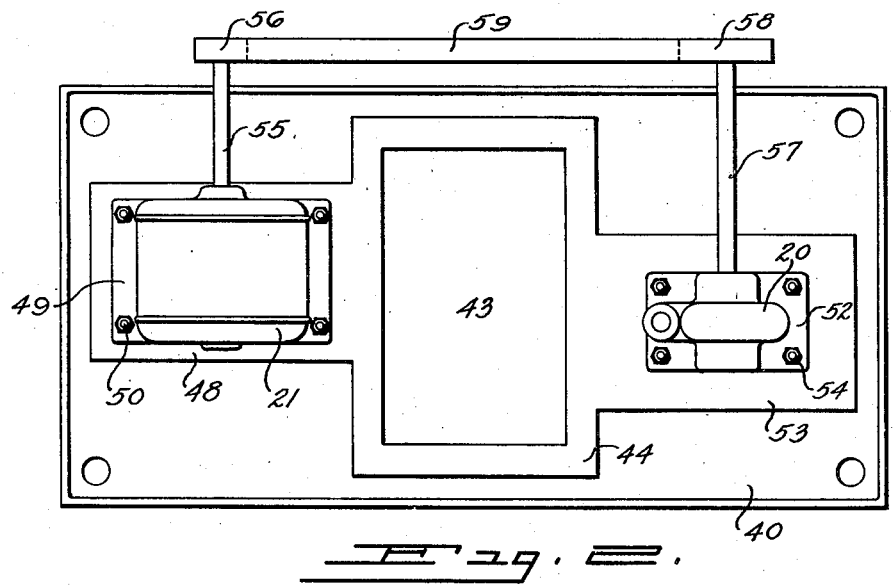
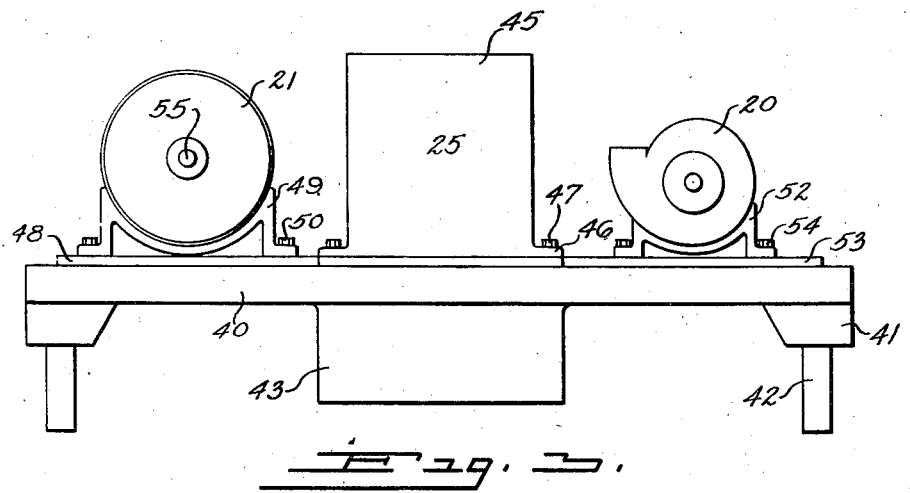

1,871,415

UNITED STATES PATENT OFFICE

GEORGE W. LORIMER, OF TROY, OHIO, ASSIGNOR, BY MESNE ASSIGNMENTS, TO BLACK PRODUCTS COMPANY, OF CHICAGO, ILLINOIS, A CORPORATION OF ILLINOIS

GAS GENERATION

Application filed September 4, 1928. Serial No. 303,826.

This invention relates to gas generation, and particularly to the generation of combustible gas from liquid fuel such as gasoline, and the like.

One of the principal objects of the invention is to provide a method, and apparatus for carrying out that method, of generating gas from liquid fuel which produces a superior and more uniform combustible gas, and which effects a material reduction in the quantity of tailings from a given quantity of liquid fuel.

Another object of the invention is to provide such a gas generating apparatus which is particularly adapted for domestic use, and which is simple in construction, highly effective, economical and automatic in operation, requiring a minimum of attention.

Other objects and advantages of the invention will be apparent from the following description; the accompanying drawings and appended claims.

In the drawings, in which like characters of reference designate like parts throughout the several views thereof—

Fig. 2 is a plan view of a unitary motor and pump mounting, with certain parts removed for purposes of illustration;

Fig. 3 is a front elevational view of Fig. 2; and

Figure 1:
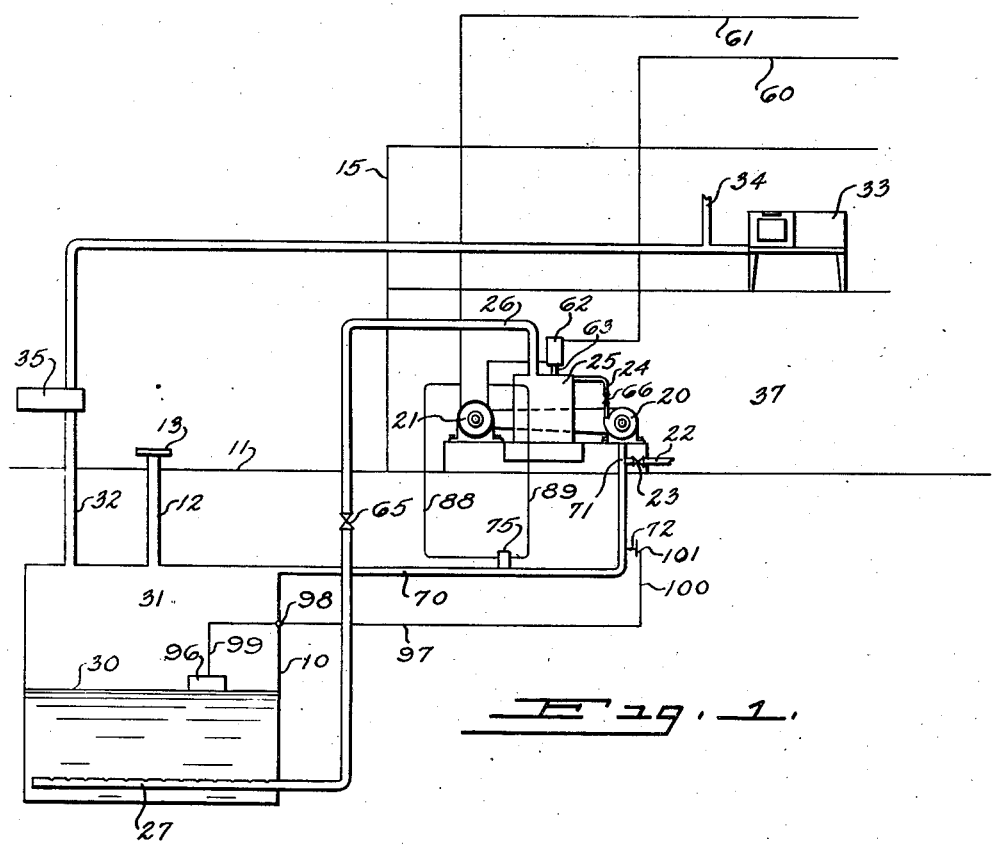
Fig. 1 is a diagrammatic side elevational view of apparatus constructed in accordance with this invention.

In gas generating plants in which combustible gas is generated by bubbling air through a body of liquid fuel, such as gasoline, the more volatile constituents of the fuel are first removed with the air leaving behind the more difficulty volatile constituents. The net result is that after the gas has been generated for a time from a particular quantity of fuel, practically all of the more volatile constituents will have been driven off leaving behind higher boiling fractions which of themselves are unsuitable for generating satisfactory gas, this proportion being termed "tailings" and being generally discarded as unfit for further gas generation. It is not uncommon that as much as 50% or more of the original quantity of liquid fuel is discarded in the tailings. Furthermore, the quality of gas is non-uniform during gas generation due to the fact that the more volatile constituents are substantially all removed in the initial part of the gas generation, resulting in a gas having a fluctuating B. t. u. value.

The present invention overcomes to a large extent the above-noted defects and provides a method of gas generation in which the body of liquid fuel is kept so effectively agitated and well mixed during gas generation that tailings are very materially reduced and a gas of good quality and uniformity is obtained throughout the entire period of gas generation from a given quality of fuel. In fact, using certain grades of high test gasoline, it is found practical with the present method and apparatus to use substantially the entire quantity of fuel in a given batch, whereby the quantity of tailings is reduced to a negligible amount. In accordance with the method of this invention, the quantity of fluid bubbled through the liquid fuel during gas generation is maintained in substantial excess of that required to generate the required amount of combustible gas. This is accomplished by by-passing a portion of the generated gas back through the liquid fuel to thereby provide for the bubbling of unusually large volumes of fluid through the liquid fuel to effectively agitate the same and keep the fuel well mixed during gas generation. The uniformity of the gas may be still better maintained and the quantity of tailings further reduced, if the quantity of generated gas by-passed back through the liquid fuel is increased as the gas generation proceeds from a given quantity of fuel or as the level of fuel being treated drops.

Referring to the drawings, a closed gas tank which may be of conventional construction is indicated at 10, being buried beneath the ground level indicated at 11. The tank is provided with a filling pipe 12 having a removable cover 13 protruding above the ground level. In domestic installations, the tank 10 is usually positioned on the exterior of the building or house indicated at 15, while the other parts of the gas generating apparatus are positioned within the building.

A pump 20 driven by a suitable power means illustrated as an electric motor 21 draws in air through an intake pipe 22 controlled by a check valve 23 and forces the air from the discharge side of the pump through pipe 24 to a pressure equalizing tank 25, and from the pressure equalizing tank through pipe 26 to a perforated distributing pipe 27 disposed within the bottom of the fuel tank 10 beneath the normal liquid level therein.

The tank 10 is normally kept partially filled with liquid fuel, such as gasoline, as indicated at 30, to thereby provide a gas storage space 31 in the upper portion of the tank. An offtake pipe 32 leads from the gas storage space to a work device or place of use of the gas, such as a gas stove indicated at 33. A branch pipe 34 leads to other work devices, not shown. Within the offtake pipe 32 is a pressure reducing valve indicated diagrammatically at 35. Any suitable and conventional construction of pressure regulating valve, such as the well known diaphragm regulator, may be used for this purpose and this is not further illustrated for that reason. Satisfactory practise in domestic use is to provide combustible gas in the storage space 31 at about a maximum effective pressure of six pounds per square inch above atmospheric, the pressure regulating valve 35 serving to reduce this pressure in the house main beyond the regulator to about two to three ounces per square inch above atmospheric.

Any suitable and conventional type of pump 20 may be used, a rotary positive displacement pump or centrifugal pump being found superior. For convenience, the motor and pump installation is formed in a unitary structure, as shown more particularly in Figs. 2 and 3, which can be positioned in a convenient location such as in the basement 37 of the building. In the construction illustrated, a suitable cast metal base 40 is provided having depending lugs at the corners within which are screw-threadedly received adjustable legs 42 for supporting the base at a convenient height. The cast base is provided with a central depending chamber 43 having an upper plane surface 44 adapted to receive thereon the inverted rectangular casing 45 which is formed with a lower flanged portion 46 adapted to seat on the plane surface 44 and be bolted thereto in gas tight relation as indicated at 47. This provides the pressure equalizing chamber 25 above referred to. The base 40 is also provided with a thickened wall portion 48 adapted to receive the motor base 49 which is bolted thereto by bolts 50. Likewise the base 52 of the pump 20 is bolted to a thickened wall portion 53 of the base 40 by bolts 54. The armature shaft 55 of the motor is extended beyond the side of the base and carries at its outer end a pulley 56, while the rotor of pump 20 is provided with an extending shaft 57 provided with a pulley 58 in alignment with the pulley 56, a belt 59 running over pulleys 56 and 58 and serving to drive pump 20 from electric motor 21.

A suitable source of electrical energy is provided for the electric motor 21. In a domestic installation, the ordinary house lighting line may be used, the leads 60 and 61 which are connected to opposite sides of the motor windings being connected to the house lighting line. Positioned within the motor circuit 60—61 is a pressure operated switch indicated diagrammatically at 62, the pressure existent within the equalizing chamber 25 being communicated thereto by pipe 63. Any suitable conventional type of automatic pressure operated switch, such as the well-known diaphragm-operated tiltable mercury switch, can be used for this purpose, and so the switch is not further illustrated here. The construction is such that when the pressure in the equalizing tank 25 drops to a predetermined minimum, the pressure responsive switch 62 is closed to start the motor and pump to thereby generate sufficient gas to raise the pressure in the system on the near side of the pressure reducing valve 35, including the gas storage space 31, pipe 26 and equalizing tank 25, until a predetermined maximum pressure is obtained. Pressure responsive switch 62 is then automatically opened, breaking the motor circuit, and the gas generation ceases until the pressure again falls to the predetermined minimum. In a house installation of this character very satisfactory results are obtained by operation between a maximum pressure of about six pounds per square inch and a minimum pressure of about one pound per square inch, although this may be varied to suit operating conditions. After the pump 20 has stopped, and the pressure in the gas space 31 drops due to consumption of gas, fluid from pipe 26 and equalizing tank 25 bubbles slowly into the tank 10 to thus equalize the pressure throughout the system on the near side of the pressure reducing valve 35. A check valve 65 is provided in pipe 26 to insure against back-flow, and a similar check valve 66, is provided in pipe 24 for the same purpose.

In the present installation, a by-pass is provided to return a portion of the generated gas to the intake side of pump 20. As shown, a by-pass pipe 70 communicates with the gas space 31 of fuel tank 10. This bypass pipe could be tapped directly into the offtake pipe 32 below the pressure regulating valve 35. The by-pass pipe 70 communicates at 71 with the intake 22 of the pump. During gas generation, a portion of the generated gas accumulated in the pressure space 31 is withdrawn through pipe 70 and drawn into the intake side of pump 20 together with air from intake 22, the resulting fluid mixture being returned through 24, 25 and 26 into the tank 10 and bubbled through the liquid fuel therein. A valve 72 is provided to control the effective cross section of the by-pass passage to thereby control the rate of flow therethrough. The parts are preferably so adjusted that a large proportion of generated gas is recirculated in this manner so that the volume of fluid bubbled through the liquid during gas generation is in substantial excess of the amount of gas required.

Figure 4:
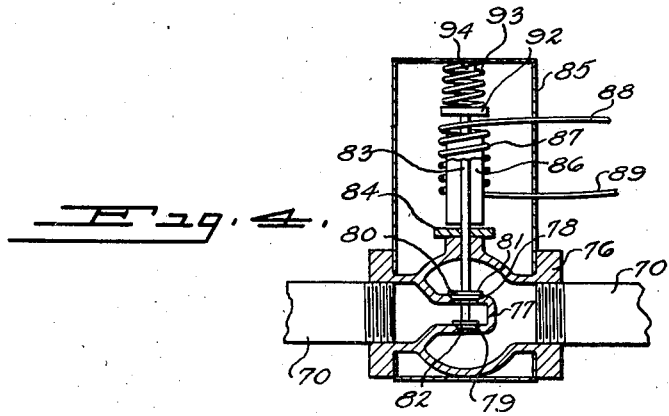
Fig. 4 is a vertical sectional view through the electrically operated valve for the bypass.

Means are provided for automatically closing by-pass 70 when the motor circuit of motor 21 is broken by the automatic switch 62, and for automatically opening the by-pass when the switch 62 is closed and the motor 21 again started. This comprises an electrically operated valve 75 positioned in the by-pass 70. Any suitable form of valve may be used, a satisfactory construction being illustrated in detail in Fig. 4. As shown therein, a valve casing 76 is mounted within pipe 70. Within this casing a central web 77 is formed having two aligned valve seats 78 and 79 upon which the balanced valve 80 comprising two conical portions 81 and 82 connected by stem 83 is adapted to seat. The stem 83 of the valve passes up through a stuffing box 84 in the valve casing and is surrounded by a cover 85. Mounted on the stem 83 is a solenoid core 86 cooperating with a solenoid coil 87, the ends of which are connected by leads 88 and 89 to the electrical circuit 60—61 of motor 21 in such a manner that the coil 87 is in multiple with the motor windings but is in series with the automatic pressure operated motor switch 62.

The construction is such that when the motor switch 62 is closed and the motor is operating, the solenoid coil 87 is energized and the valve 75 is lifted from its seat to open by-pass 70. When the motor circuit switch 62 is broken and the motor is stopped, the electrical energy is cut off from leads 88—89 of the solenoid coil 87 and the coil is de-energized with the result that valve 75 is closed. In order to insure positive closing of the valve, the upper portion of stem 83 is provided with a collar 92, and a coil spring 93 surrounds the upper end of the valve stem 83 and bears at one end against collar 92 and at the other end against cover 85, surrounding a guide 94 carried by the cover. The electrical connections of the valve 75 being in multiple with the motor windings permit a large current to be supplied to the motor, while only a small operating current flows through the resistance coil of the valve.

Means are also provided for increasing the proportion of generated gas recirculated through the by-pass 70 as the level of fuel in tank 10 drops. As shown, a float 96 is provided which is responsive to variations in liquid level in tank 10. A lever 97 pivoted at 98 to the side wall of the tank and passing through a stuffing box in the side wall is pivotally connected by a link 99 to float 96. The opposite end of lever 97 is pivotally connected by a link 100 to the operating stem 101 of valve 72, which may be a conventional butterfly valve. The arrangement of the linkage is such that as the float 96 falls with a dropping liquid level, the valve stem 101 is moved through the linkage connections to effect opening movement of valve 72, and conversely when the level of fuel in tank 10 is raised as by introducing fresh fuel through filling opening 12 the valve 72 is moved toward closed position to decrease the effective cross section of by-pass 70. Thus during gas generation, the flow through the by-pass is automatically varied in accordance with variations in liquid level. When gas generation is first begun with a fresh quantity of liquid fuel, the recirculation through by-pass 70 is maintained at a minimum, but as the gas generation proceeds this circulation is gradually increased in proportion to the amount of gas generated, resulting in the generation of gas of more uniform quality throughout the entire period of gas generation and in a reduction in the amount of tailings.

In operation, as gas is used by a work device such as stove 33 and the pressure within the gas storage space 31 falls, and consequently the pressure within equalizing chamber 25 falls to a predetermined minimum due to the equalizing action of pipe 26, the pressure responsive switch 62 is closed to thereby close the motor circuit 60—61 of motor 21 to drive pump 20. With the closing of switch 62, the solenoid coil 87 of the electrically operated valve 75 is energized to open by-pass 70. The effective flow through by-pass 70 is then controlled by valve 72. As the pump 20 operates, a portion of generated gas in pressure space 31 is withdrawn through by-pass 70 and mixed with incoming air from intake 22, and the mixed fluids are then passed through pipe 24, equalizing chamber 25 and pipe 26 into the liquid fuel within tank 10 to cause a violent agitation of this fuel. When the pressure builds up within pressure space 31 and equalizing tank 25 to a predetermined maximum, the switch 62 of the motor circuit is again opened to stop motor 21 and pump 20. As soon as the switch 62 is broken, the solenoid coil is deenergized permitting valve 75 to resume its closed position to close by-pass 70, thereby insuring against leakage of gas from pressure space 31. Inasmuch as the motor armature and the rotor of the pump continue to coast for a short time after switch 62 is broken, it is seen that the valve 75 is closed prior to the stopping of pump 20, further insuring against escape of gas pressure during the automatic operation of the plant. As the gas generation proceeds and the liquid fuel level in tank 10 drops, the float 96 falls and through the linkage connections effects movement of valve 72 toward open position to thereby increase the proportion of generated gas recirculated through by-pass 70.

While the method herein described and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. Apparatus of the character described, comprising a fuel tank for containing a quantity of liquid fuel, means for bubbling a combustion-supporting fluid through the liquid fuel in said tank, an offtake pipe for said tank, and a by-pass for returning generated gas to said tank to be bubbled through the liquid fuel therein to thereby increase the agitation and mixing of said liquid fuel during gas generation.

2. Apparatus of the character described, comprising a fuel tank for containing a quantity of liquid fuel, a pump for forcing air into said tank below the normal fuel level therein to effect bubbling of the air through the liquid fuel, an intake passage for said pump, an offtake pipe for said fuel tank, and a by-pass for returning generated gas to the intake of said pump to be thereby recirculated through the fuel in said fuel tank.

3. Apparatus of the character described, comprising a fuel tank partially filled with liquid fuel to provide a gas space thereabove, a pump, an air intake for said pump, a discharge for said pump, a pipe connecting the discharge of said pump with the interior of said fuel tank below the liquid level therein, a check valve in said pipe, an offtake pipe leading from the gas space of said fuel tank, a by-pass connecting the gas space of said fuel tank with the air intake of said pump, and a valve for controlling said by-pass.

4. Apparatus of the character described, comprising a fuel tank for containing a quantity of liquid fuel, a pump for causing air to pass into said tank below the normal fuel level therein to effect bubbling of the air through the liquid fuel, an offtake pipe for said tank, a by-pass for returning generated gas to said tank to be thereby recirculated through the fuel therein, and an electrically operated valve for controlling said by-pass.

5. Apparatus of the character described, comprising a fuel tank for containing a quantity of liquid fuel, a pump for causing air to pass into said tank below the normal fuel level therein to effect bubbling of the air through the liquid fuel, an offtake pipe for said tank, a by-pass for returning generated gas to said tank to be thereby recirculated through the fuel therein, and control means effective to automatically close said by-pass prior to stopping of said pump.

6. Apparatus of the character described, comprising a fuel tank containing a quantity of liquid fuel, a pump for causing air to pass into said tank below the normal fuel level therein to effect bubbling of the air through the liquid fuel, power means for driving said pump, an offtake pipe for said tank, a by-pass for returning generated gas to said tank to be thereby recirculated through the fuel therein, and control means for automatically closing said by-pass upon stopping of said power means.

7. Apparatus of the character described, comprising a fuel tank containing a quantity of liquid fuel, a pump for forcing air into said tank below the normal fuel level therein to effect bubbling of air through the liquid fuel, an intake for said pump, an electric motor for driving said pump, an electric circuit for said motor, a switch in said motor circuit, an offtake pipe for said tank, a by-pass for returning generated gas to the intake of said pump, and control means for automatically closing said by-pass when said motor circuit switch is opened.

8. Apparatus of the character described, comprising a fuel tank containing a quantity of liquid fuel, a pump for forcing air into said tank below the normal fuel level therein to effect bubbling of air through the liquid fuel, an intake for said pump, an electric motor for driving said pump, an electric circuit for said motor, a switch in said motor circuit, an offtake pipe for said tank, a by-pass for returning generated gas to the intake of said pump, an electrically operated valve for said by-pass, and electrical connections between said motor circuit and said electrically operated valve so arranged that breaking of the motor circuit by opening of the motor circuit switch cuts off the supply of electrical energy to the electrical connections of said valve.

9. Apparatus of the character described, comprising a fuel tank containing a quantity of liquid fuel, a pump for causing air to pass into said tank below the normal fuel level therein to effect bubbling of air through the liquid fuel, an electric motor for driving said pump, an electric circuit for said motor, a switch in said motor circuit, an offtake pipe for said tank, a by-pass for returning generated gas to said tank to be thereby recirculated through the fuel therein, an electrically operated valve in said by-pass, and electrical connections for said valve connected in multiple with said motor windings and in series with said motor circuit switch.

10. Apparatus of the character described, comprising a fuel tank for containing a quantity of liquid fuel, a pump for causing air to pass into said tank below the normal fuel level therein to effect bubbling of the air through the liquid fuel, a by-pass for returning generated gas to said tank to be thereby recirculated through the fuel therein, an automatically operated valve for opening and closing said by-pass, and a second valve for controlling the effective opening of said by-pass to control the rate of flow therethrough when said first-mentioned valve is in open position.

11. Apparatus of the character described, comprising a fuel tank for containing a quantity of liquid fuel, a pump for causing air to pass into said tank below the normal fuel level therein to effect bubbling of the air through the liquid fuel, an offtake pipe for said fuel tank, a by-pass for returning generated gas to said tank to be thereby recirculated through the fuel therein, and control means for automatically regulating flow through said by-pass in accordance with the level of liquid fuel in said fuel tank.

12. Apparatus of the character described, comprising a fuel tank for containing a quantity of liquid fuel, a pump for causing air to pass into said tank below the normal fuel level therein to effect bubbling of the air through the liquid fuel, an offtake pipe for said fuel tank, a by-pass for returning generated gas to said tank to be thereby recirculated through the fuel therein, a valve in said by-pass, and control means for automatically moving said valve toward open position as the level in said fuel tank drops.

13. Apparatus of the character described, comprising a fuel tank for containing a quantity of liquid fuel, a pump for forcing air into said tank below the normal fuel level therein to effect bubbling of the air through the liquid fuel, an intake passage for said pump, an offtake pipe for said fuel tank, a by-pass for returning generated gas to the intake of said pump to be thereby recirculated through the fuel in said fuel tank, a valve for said by-pass, a float in said fuel tank responsive to liquid level variations therein, and operative connections between said float and said valve effective to vary the positioning of said valve in accordance with variations in liquid level in said fuel tank.

14. Apparatus of the character described for the generation of combustible gas from gasoline comprising a gasoline tank, a pumping means, a distributing pipe at the bottom of said tank and connected to the outlet side of said pumping means for bubbling air through gasoline in the tank, a connection from an upper portion of the tank to the inlet side of said pumping means for recirculating a substantial amount of gas through said distributing pipe to increase the richness of the gas and to agitate and mix the gasoline during gas generation, an electric motor for operating said pumping means, and a pressure switch for automatically controlling the operation of said motor.

15. Apparatus of the character described for the generation of combustible gas from gasoline or the like at ordinary temperatures comprising a main gasoline reservoir tank for holding gasoline at various liquid levels, a pump, a perforated distributing pipe at the bottom of said tank and connected to the outlet side of the pump for bubbling air through the gasoline in the tank, a connection from an upper portion of the tank to the inlet side of the pump for recirculating a substantial amount of gas through said distributing pipe to increase the richness of the gas and agitate and mix the gasoline during gas generation, and means for automatically controlling the amount of recirculation in accordance with the liquid level in the tank, and means for operating said pump.

16. Apparatus of the character described for the generation of combustible gas from gasoline or the like at ordinary temperatures comprising a main gasoline reservoir tank for holding gasoline at various liquid levels, a pump, a perforated distributing pipe at the bottom of said tank and connected to the outlet side of the pump for bubbling air through the gasoline in the tank, a connection from an upper portion of the tank to the inlet side of the pump for recirculating a substantial amount of gas through said distributing pipe to increase the richness of the gas and agitate and mix the gasoline during gas generation, an electric motor connected to said pump, a pressure switch responsive to variations in pressure in said tank, and electrical connections from said switch to said motor to control the starting and stopping of the motor for maintaining predetermined pressures in said tank.

17. In a pressure regulated gas generating machine, in combination, a fuel tank adapted to contain liquid fuel, a pump for forcing air into said tank below the fuel level therein to bubble air through the fuel, driving means for said pump, and a pipe connection from the tank above the fuel level to the inlet side of the pump for returning generated gas to the inlet side of the pump, and means for automatically starting and stopping the driving means at predetermined pressures.

18. A gas generating apparatus of the character described, comprising a fuel tank adapted to be partly filled with liquid fuel, a pump having an inlet pipe, a check valve in said pipe, driving means for said pump, pipe connections from the outlet side of the pump to a low portion of the fuel tank, and a pipe connection from the fuel tank above the fuel level therein to the inlet side of the pump but between the pump and said check valve.

19. In a pressure regulated gas generating system, a tank adapted to contain gasoline, a pump for bubbling air through said gasoline, a pipe connection from the outlet side of the pump to a low portion of the tank, an electric motor for operating said pump, means for automatically maintaining the quality of the gas generated substantially uniform when the quantity of the gasoline in the tank varies, mechanism responsive to variations in the quantity of the gasoline in the tank for controlling said last named means, and means responsive to changes in pressure in said tank for controlling said motor.

In testimony whereof I hereto affix my signature.

GEORGE W. LORIMER.